United States Patent
Chiang

(10) Patent No.: US 7,685,336 B2
(45) Date of Patent: Mar. 23, 2010

(54) KEYBOARD-MOUSE-VIDEO SWITCH WITH A DIGITAL VISUAL INTERFACE

(75) Inventor: Li-Shan Chiang, Taipei Hsien (TW)

(73) Assignee: ATEN International Co., Ltd., Hsichih (TW)

( * ) Notice: Subject to any disclaimer, the term of this patent is extended or adjusted under 35 U.S.C. 154(b) by 480 days.

(21) Appl. No.: 11/038,314

(22) Filed: Jan. 19, 2005

(65) Prior Publication Data
US 2006/0114234 A1    Jun. 1, 2006

(30) Foreign Application Priority Data
Nov. 30, 2004    (TW) ............................... 93136903 A

(51) Int. Cl.
   *G06F 13/38* (2006.01)
(52) U.S. Cl. .............................. 710/62; 710/69; 710/70
(58) Field of Classification Search .................. 710/62, 710/63, 70; 345/148
   See application file for complete search history.

(56) References Cited

U.S. PATENT DOCUMENTS

| | | | |
|---|---|---|---|
| 6,112,264 A * | 8/2000 | Beasley et al. ................ | 710/38 |
| 6,609,034 B1 | 8/2003 | Behrens et al. | |
| 6,671,756 B1 | 12/2003 | Thomas et al. | |
| 7,519,749 B1 * | 4/2009 | Sivertsen ...................... | 710/73 |
| 2002/0049879 A1 * | 4/2002 | Eyer ........................... | 710/305 |
| 2002/0054029 A1 | 5/2002 | Glancy et al. | |
| 2002/0075249 A1 * | 6/2002 | Kubota et al. ................ | 345/204 |
| 2002/0091850 A1 * | 7/2002 | Perholtz et al. ............. | 709/231 |
| 2003/0035049 A1 * | 2/2003 | Dickens et al. .............. | 348/100 |
| 2003/0149987 A1 * | 8/2003 | Pasqualino et al. ............ | 725/80 |
| 2005/0132403 A1 * | 6/2005 | Lee et al. ....................... | 725/38 |

FOREIGN PATENT DOCUMENTS

WO    WO 03/071804    8/2003

OTHER PUBLICATIONS

Leunig, DER DVI-Standard—ein Uberblick, White Paper, 2002.

* cited by examiner

*Primary Examiner*—Henry W. H. Tsai
*Assistant Examiner*—John B Roche
(74) *Attorney, Agent, or Firm*—Chen Yoshimura LLP

(57) ABSTRACT

A keyboard-mouse-video (KVM) switch has a server interface, a client interface, a switch circuit and a digital video overlapping circuit. The server interface is connected to plural computers, and the client interface is connected to plural sets of manipulation and display devices. The switch circuit routes paths between the computers and the sets of manipulation and display device. The digital video overlapping circuit overlaps a digital video overlapping image onto a digital video signal received from one of the computers through the server interface. The overlapped digital video signal is then transmitted to one of the sets of manipulation and display device through the client interface.

14 Claims, 5 Drawing Sheets

KEYBOARD-MOUSE-VIDEO SWITCH WITH A DIGITAL VISUAL INTERFACE

RELATED APPLICATIONS

The present application is based on, and claims priority from, Taiwan Application Serial Number 93136903, filed on Nov. 30, 2004, the disclosure of which is hereby incorporated by reference herein in its entirety.

BACKGROUND

1. Field of Invention

The present invention relates to a computer switch. More particularly, the present invention relates to a keyboard-mouse-video switch with a digital visual interface.

2. Description of Related Art

With the rapid development in information technology, computers and their peripherals have become very popular. Typically, each computer is equipped with one set of manipulation and display devices, including a keyboard, a mouse, a monitor, and a speaker. However, this equipment wastes money and space if one has several computers. Therefore, a keyboard-video-mouse (KVM) switch is proposed to use at least one set of manipulation and display devices to manage several computers and their peripherals. Using the KVM switch reduces costs and decreases the waste of space while simultaneously conquering the problem of compatibility between different interfaces.

Digital video signals of the computer generally have to be converted into analog video signals for display on a traditional display device having an analog interface. The conventional KVM switch thus provides analog interfaces to transmit such video signals between computers and display devices. However, the analog video signals are easily affected by the transmission line, and the image constructed from the analog video signal is not good enough. On the other hand, a digital display working group (DDWG) established at the Intel Developer Forum (IDF) announced a new video interface, called the Digital Visual Interface (DVI), on September, 1998.

A main purpose of the DVI is to transmit video signals of a video display card directly to a display device, completely in digital format. The digital interface ensures that all video contents are transmitted in digital format to keep the data completeness of the whole transmission from the computer to the display device (without introduction of any interference signals), and thus a clearer and sharper image is obtained. Because the traditional and popular CRT display uses analog video signals, the conventional D-sub 15 pin connectors for displays are designed for the analog signals (complex signals). The digital video signals of the video display card have to be converted into analog video signals before being transmitted to the display when the conventional D-sub 15 pin connector is used. The conversions of digital/analog or analog/digital and the transmission of analog signals unavoidably degrade the image quality.

Digital displays including intrinsic digital designs, such as liquid crystal displays, liquid crystal projectors, plasma televisions, and liquid crystal television, have become popular and cheap in recent years. However, transmission of digital video signals through the conventional D-sub 15 pin connector, where the digital video signals are firstly converted into analog video signals for transmission to the digital display, and then are converted back into the digital video signals in the digital display, is both unwise and wasteful.

SUMMARY

It is therefore an aspect of the present invention to provide a KVM switch with a digital visual interface, which can overlay an on-screen display (OSD) image onto an original digital video signal, for assisting a user to manipulate, manage or monitor switches or system conditions of the KVM switch.

According to one preferred embodiment of the present invention, a KVM switch with a digital visual interface comprises a server interface, a client interface, a switch circuit and a digital video overlapping circuit. The server interface is connected to plural computers, and the client interface is connected to plural sets of manipulation and display devices. The switch circuit routes paths between the computers and the sets of manipulation and display devices. The digital video overlapping circuit overlaps a digital video overlapping image onto a digital video signal received from one of the computers through the server interface. The overlapped digital video signal is then transmitted to one of the sets of manipulation and display devices through the client interface.

It is another aspect of the present invention to provide a KVM switch, which can switch analog and digital video signals, and provide corresponding OSD images for video signals of different types. The KVM switch improves the manipulating function and enhances the compatibility and expandability.

According to another embodiment of the present invention, a KVM switch comprises a server interface, a client interface, a switch circuit, a digital video overlapping circuit and an analog video overlapping circuit. The server interface has analog and digital visual interfaces, and is connected to plural computers. The client interface has analog and digital visual interfaces, and is connected to plural sets of manipulation and display devices. The switch circuit routes paths between the computers and the sets of manipulation and display devices. The digital video overlapping circuit overlaps a digital video overlapping image onto a digital video signal received from one of the computers through the server interface. The overlapped digital video signal is then transmitted to one of the sets of manipulation and display devices through the client interface. The analog video overlapping circuit overlaps an analog video overlapping image onto a digital video signal received from one of the computers through the server interface. The overlapped analog video signal is then transmitted to one of the sets of manipulation and display devices through the client interface.

BRIEF DESCRIPTION OF THE DRAWINGS

These and other features, aspects, and advantages of the present invention will become better understood with regard to the following description, appended claims, and accompanying drawings, where:

DESCRIPTION OF THE PREFERRED EMBODIMENTS

Figure 1A:
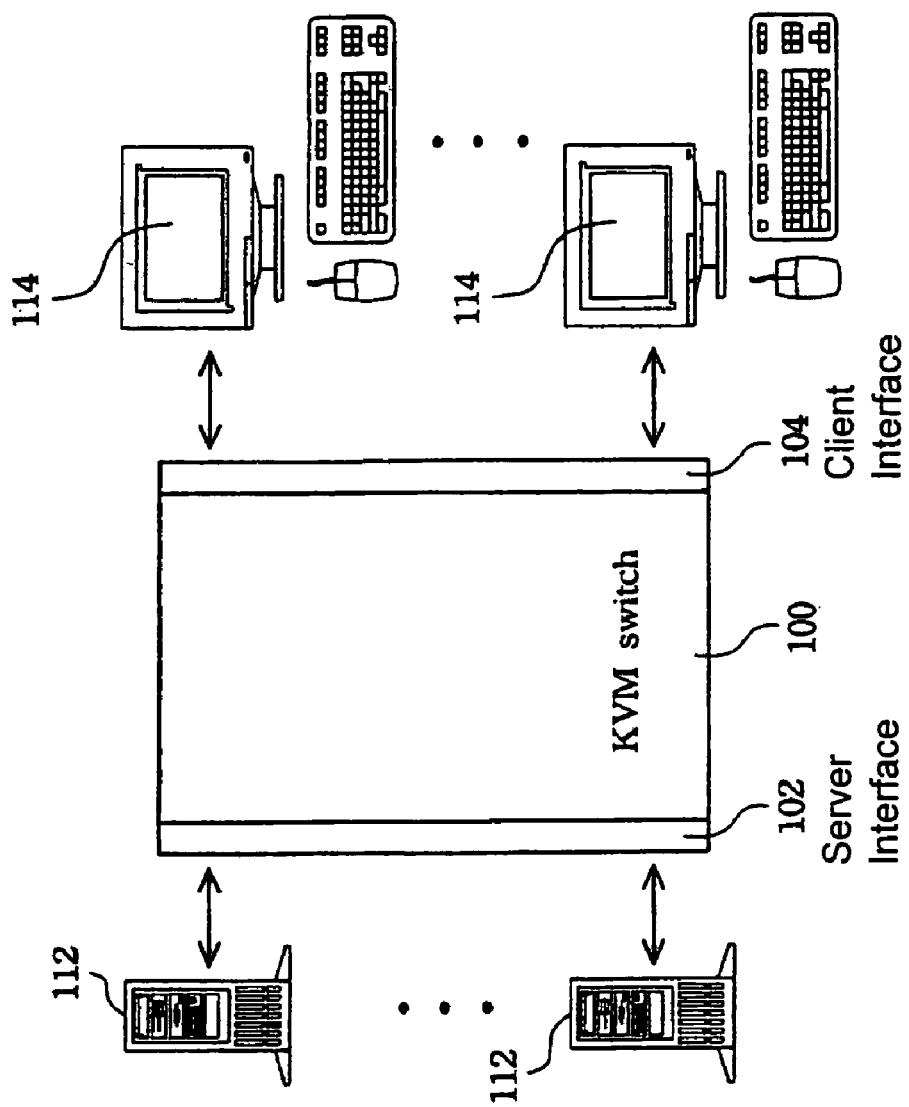
FIG. 1A is a schematic view of the external connection of one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

First of all, some designations are determined for clear description. The initial and original digital video signals of the following embodiments are designated as DS, the digital video signal DS being converted is designated as the converted digital video signal CDS, the converted digital video signal CDS being overlapped by an OSD image is designated as the overlapped digital video signal OCDS, and the digital video signal OCDS being converted again is designated as the converted and overlapped digital video signal COCDS.

FIG. 1A is a schematic view of the external connection of one preferred embodiment of the present invention, for illustrating how plural sets of manipulation and display devices 114 are connected to a plurality of computers 112 through a KVM switch 100. As illustrated in FIG. 1A, a server interface 102 is arranged to connect the computers 112, and a client interface 104 is arranged to connect the sets of manipulation and display devices 114. The computers 112 can be servers, personal computers, notebooks or other computing devices having video output functions. One of the sets of manipulation and display devices 114 includes manipulating devices (such as a keyboard and a mouse) and a display device (such as a CRT display or an LCD display).

The KVM switch 100 of the preferred embodiment supports the digital visual interface, e.g. the DVI connectors. That is, one computer 112 can transmit digital video signals to the KVM switch 100 through the server interface 102 having the digital visual interface, and the digital video signals can be transmitted to a predetermined set of manipulation and display devices 114 through the client interface 104 having the digital visual interface.

Figure 1B:
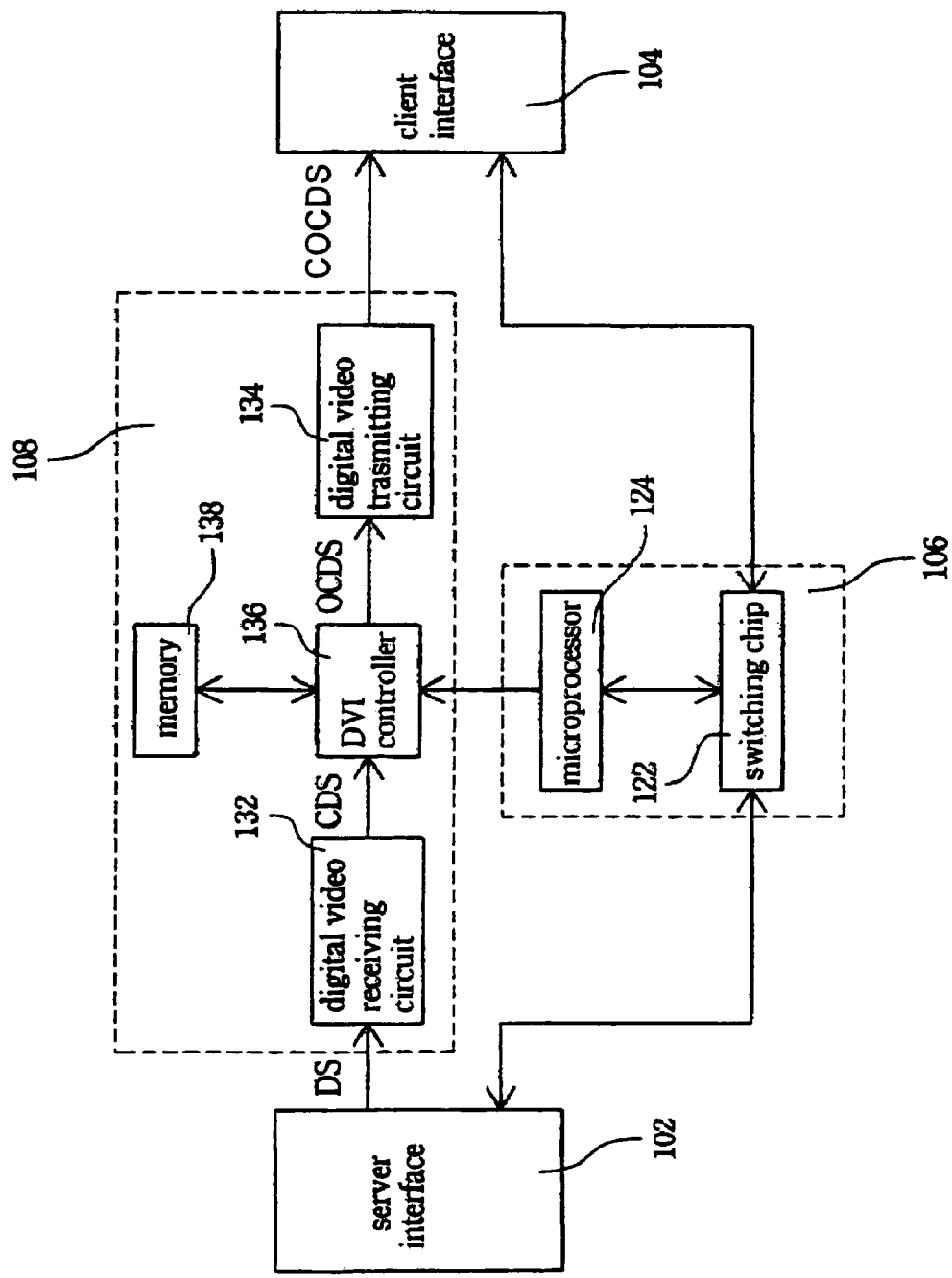
FIG. 1B is a schematic view of the interior of the KVM in FIG. 1A.

FIG. 1B is a schematic view of interior of the KVM SWITCH 100 in FIG. 1A, and the following description refers to FIG. 1A and FIG. 1B. As shown in FIG. 1B, the KVM SWITCH 100 shown in FIG. 1A further includes a switch circuit 106 and a digital video overlapping circuit 108. The switch circuit 106 is arranged to route paths between the computers 112 and the sets of manipulation and display devices 114. More particularly, the switch circuit 106 of the preferred embodiment has a switch chip 122 and a microprocessor 124. Electrical signals of the sets of manipulation and display devices 114, such as mouse signals or keyboard signals, are transmitted to the switch chip 122 through the client interface 104. The electrical signals are then transmitted to a predetermined one of the computers 112 according to paths stored in and routed by the switch chip 122. The paths are arranged and set by the microprocessor 124 based on a path selection setting, and users can modify the path selection setting through physical pressing or software control.

In another aspect, the digital video overlapping circuit 108 is arranged to receive a digital video signal DS from the computers 112 through the server interface 102. The digital video overlapping circuit 108 overlaps a digital video overlapping image, i.e. an on-screen display (OSD) image, onto the digital video signal DS according to an electrical signal from the sets of manipulation and display devices 114, and thus an overlapped digital video signal COCDS is generated.

The overlapped digital video signal COCDS is then transmitted to a predetermined one of the sets of manipulation and display devices 114 through the client interface 104.

More particularly, the digital video overlapping circuit 108 further includes a digital video receiving circuit 132, a digital video transmitting circuit 134 and a digital image generating circuit. After receiving the digital video signal DS, the digital video receiving circuit 132 is arranged to convert a signal mode of the digital video signal DS such that a digital video overlapping image is suitable for being overlapped onto the converted digital video signal CDS. In the preferred embodiment, the digital video signal DS, of which the original signal mode is TMDS (Transition Minimized Differential Signal), is converted into 24-bit pixel data for a subsequent digital video overlapping stage.

The digital image generating circuit is arranged to generate the digital video overlapping image according to the data stored in the switch circuit 106. For example, the content of the digital video overlapping image can display the system condition of the KVM switch 100 and the paths stored in the switch chip 122, for assisting users to manipulate and manage the KVM switch 100. Moreover, the digital video overlapping image contains a plurality of characters. The character can be words, letters of alphabets, numerals, symbols or icons, and each of the characters has a plurality of colors. Users can define these characters according to their needs, and store the setting of the digital video overlapping image in a memory 138.

In the preferred embodiment, the digital image generating circuit is a DVI controller 136. According to an electrical signal from the sets of manipulation and display devices 114 (such as keyboard commands entered by users), the microprocessor 124 instructs the DVI controller 136 to overlap the generated digital video overlapping image (i.e. the OSD image) onto the digital video signal CDS, thus completing the procedure of digital image overlapping. It is noted that, based on the digital image characteristics, the digital video overlapping image can be translucently overlapped onto the digital video signal CDS by the DVI controller 136. Therefore, the digital video overlapping image is translucently displayed on the set of manipulation and display devices 114, and the users can observe the image made of the original digital video signal and the additional digital video overlapping image, simultaneously.

Next, the digital video transmitting circuit 134 is arranged to convert a signal mode of the overlapped digital video signal OCDS such that the converted and overlapped digital video signal COCDS is suitable for transmission to the set of manipulation and display devices 114. As mentioned above, the digital video signal OCDS, of which the signal mode is 24-bit pixel data at this time, is converted into TMDS (Transition Minimized Differential Signal). Moreover, the digital video transmitting circuit 134 supports displays ranging from VGA to UXGA resolutions (25-165 MHz), and therefore is suitable for the sets of manipulation and display device 114 (such as LCDs).

In addition, the set of manipulation and display devices 114 from which the user sends electrical signals can be the same as or different from the set of manipulation and display devices 114 that displays the overlapped digital video signal COCDS. When the two sets are the same, the digital video overlapping image is displayed on the set of manipulation and display devices 114 used by the user at the same time. When the two sets are different, one user can make the digital video overlapping image be displayed on one set of manipulation and display devices 114 used by another user, and the digital video overlapping image is not limited to display to only one other user. This configuration allows a system administrator to manage and monitor other users with the digital video overlapping image, and thus enhances the management and monitoring performance of the KVM switch 100.

Figure 1C:
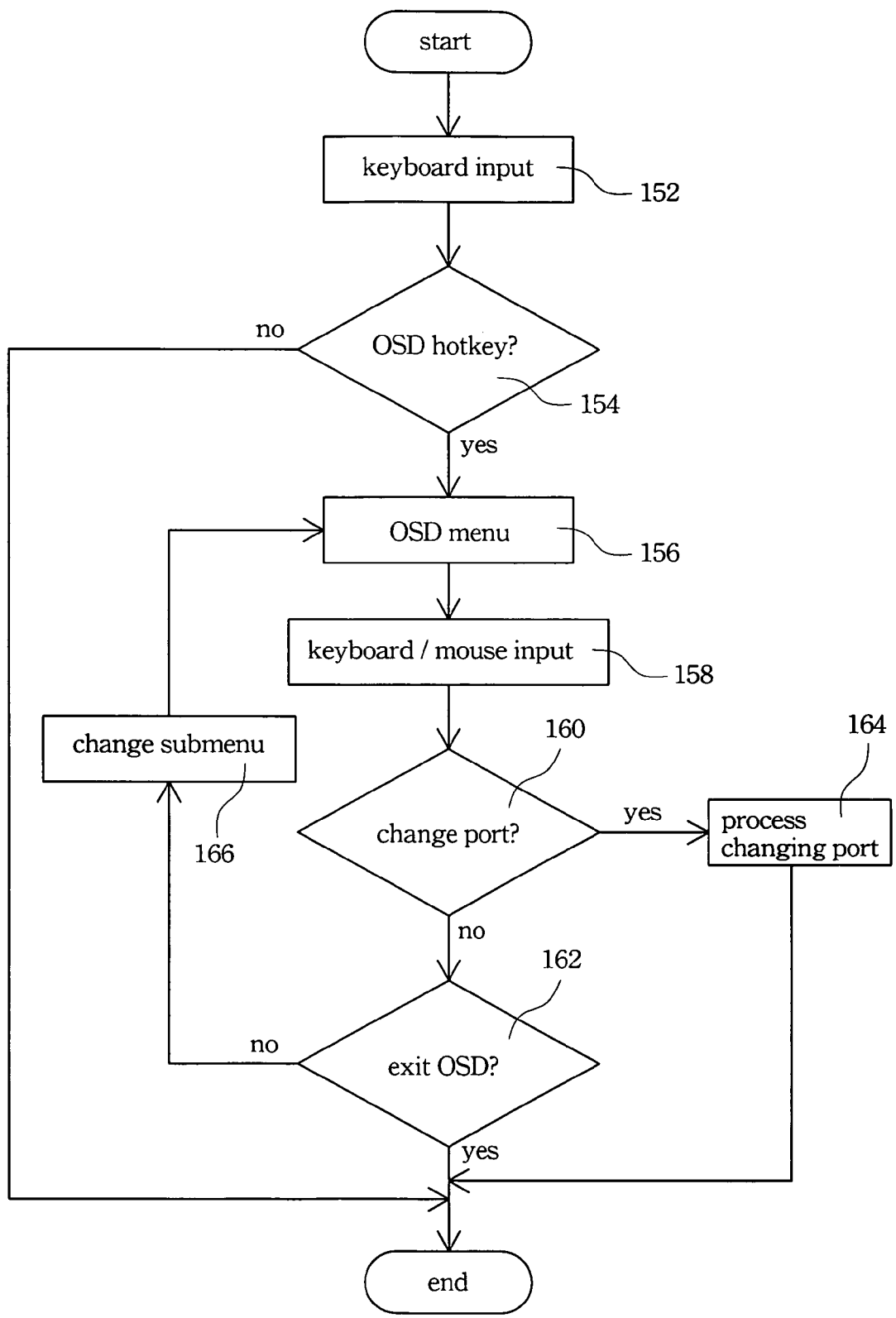
FIG. 1C is a flow chart describing an image overlapping procedure of the KVM switch in FIG. 1A.

FIG. 1C is a flow chart describing an image overlapping procedure of the KVM switch 100 in FIG. 1A. In FIG. 1C, a user switching to manipulate different computers 112 by the OSD image is taken as an example to further interpret the image overlapping procedure of the preferred embodiment. The following description refers to FIG. 1A and FIG. 1B.

First, the user inputs an electrical signal to call out the OSD image by using the set of manipulation and display devices, such as a keyboard (step 152). When the electrical signal input by the user fits a predefined hotkey (such as CTRL+CTRL or ScrollLock+ScrollLock) (step 154), the microprocessor 124 instructs the DVI controller 136 to overlap the digital video overlapping image (i.e. the OSD image) onto the original digital video signal (step 156). The digital video overlapping image for example is an OSD menu, of which the content shows the system condition of the KVM switch 100 and the paths stored in the switch chip 122, for assisting users to manipulate and manage the KVM switch 100.

Next, the user inputs electrical signals to manipulate the OSD menu by the set of manipulation and display devices 114 (such as the keyboard or the mouse) (step 158). When the electrical signals input by the user indicates to switch computers (step 160), the microprocessor 124 accordingly refreshes the path selection setting and rearranges the paths stored in the switch chip 122. The set of manipulation and display devices 114 currently used by the user is thus switched to another computer 112 (step 164).

In another aspect, when the users does not command a switch of computers, the OSD menu ask the user if the user wants to exit the OSD menu or not (step 162). If the user wants to exit the OSD menu, the image overlapping procedure is terminated to make the KVM switch 100 return to the normal operation. If the user does not want to exit the OSD menu, the OSB menu may provide other submenus for the user to change (step 166), in order to further manipulate, manage or monitor the KVM SWITCH 100 by the OSD menu.

The preferred embodiment provides a KVM switch with a digital visual interface, which overlays an OSD image onto an original digital video signal, for assisting a user to manipulate, manage or monitor switches or system conditions of the KVM switch. Moreover, the digital OSD image can be translucently overlapped onto the original digital video signal. Therefore, the user can also observe the image constructed by the original digital video signals and view the OSD image at the same time, and thus takes care of information from both two images.

Figure 2A:
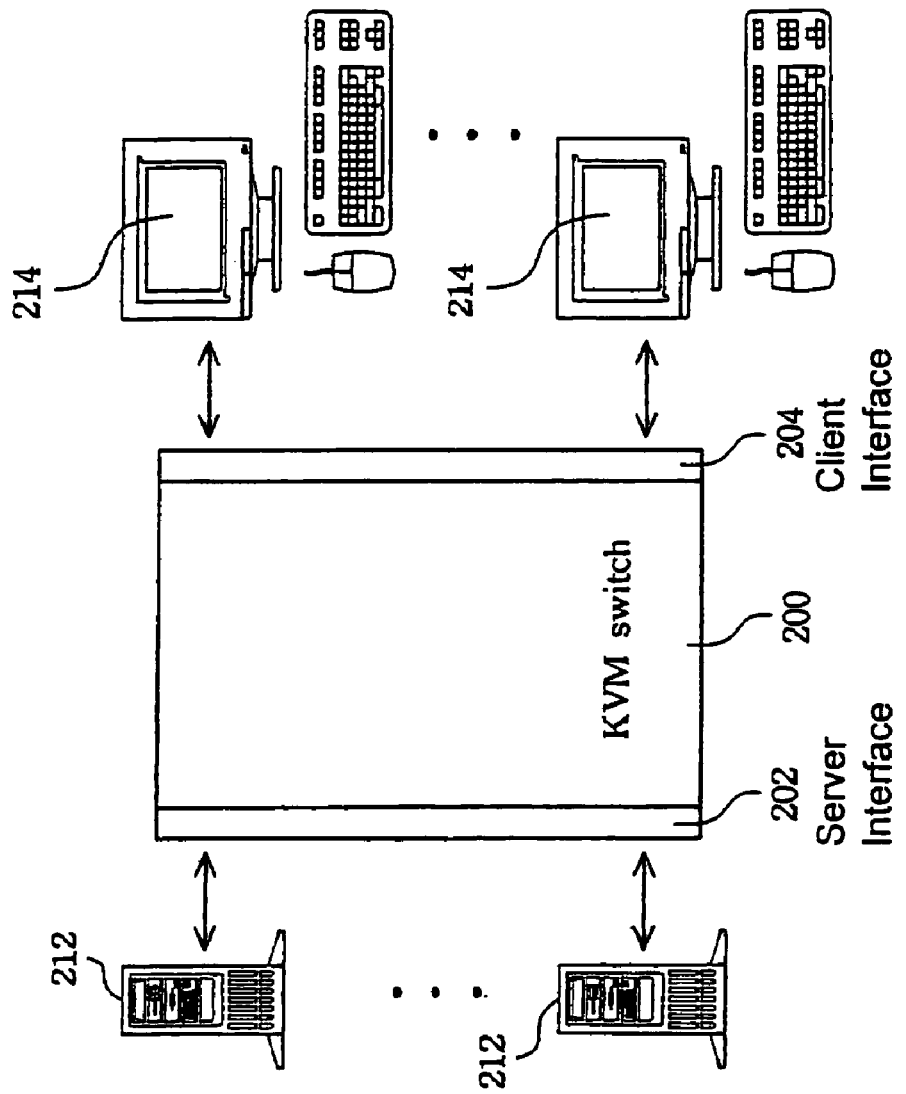
FIG. 2A is a schematic view of the external connection of another preferred embodiment of the present invention.

FIG. 2A is a schematic view of the external connection of another preferred embodiment of the present invention. As illustrated in FIG. 2A, a KVM switch 200 has a server interface 202 and a client interface 204. The server interface 202 is arranged to connect a plurality of computers 212, and the client interface 204 is arranged to connect plural sets of manipulation and display devices 214. Similar to the foregoing embodiment, the computers 212 can be servers, personal computers, notebooks or other computing devices having video output functions. One of the sets of manipulation and display device 214 includes manipulating devices (such as a keyboard and a mouse) and a display device (such as a CRT display or an LCD display).

More particularly, in this preferred embodiment, both the server interface 202 and the client interface 204 support the digital visual interface and the analog visual interface, such as providing DVI-I (DVI-integrated) connectors, or providing DVI connectors and traditional D-sub 15 pin connectors. Therefore, the computers and the manipulation and display device can be connected to the KVM switch 200 selectively through the digital visual interface or the analog visual interface. That is, one computer 212 can transmit video signals to the KVM switch 200 through the server interface 202 having a digital visual interface and an analog visual interface, and the video signals can be transmitted to a predetermined set of manipulation and display devices 214 through the client interface 204 having a digital visual interface and an analog visual interface.

Figure 2B:
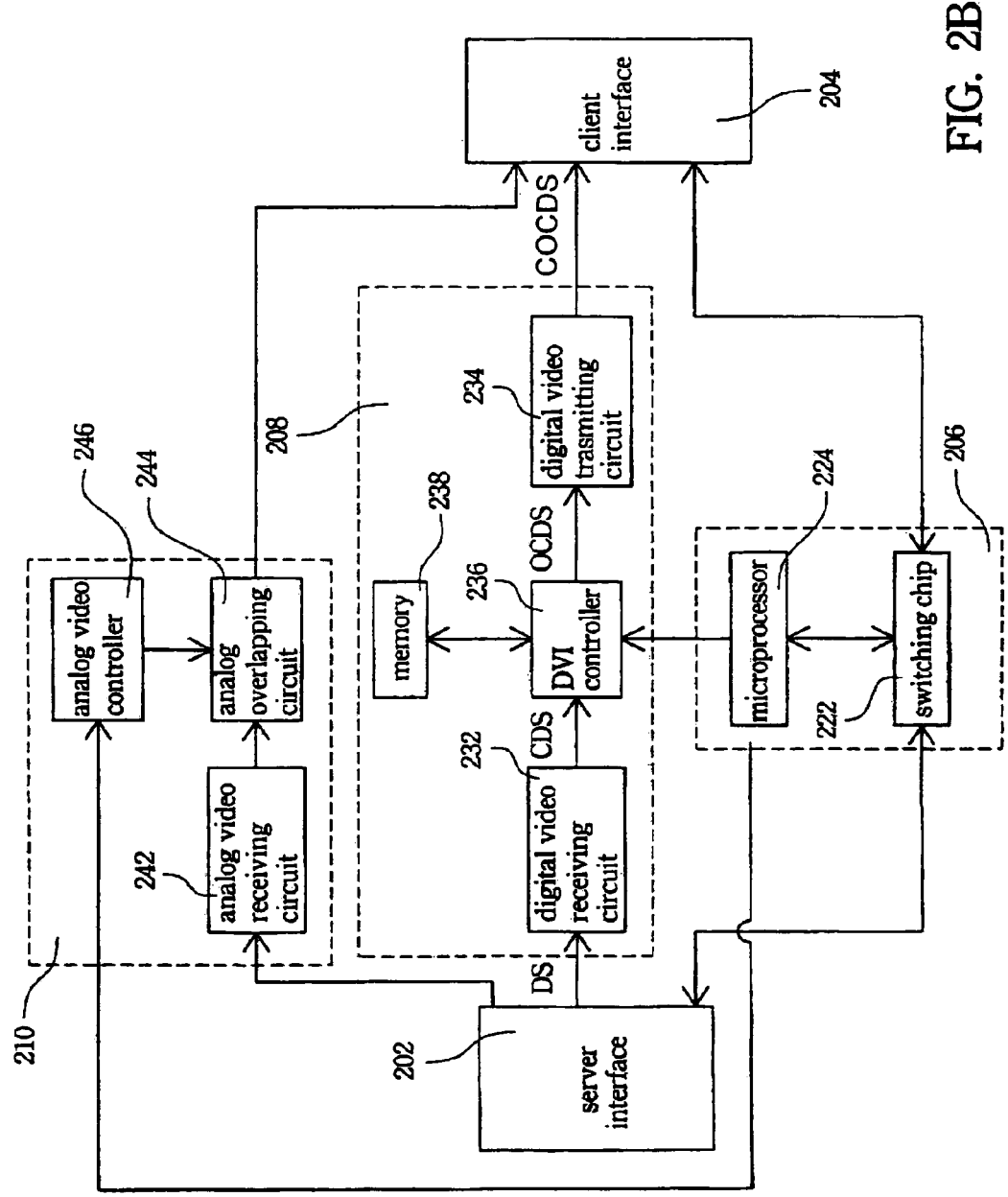
FIG. 2B is a schematic view of the interior of the KVM in FIG. 2A.

FIG. 2B is a schematic view of interior of the KVM 200 in FIG. 2A, and the following description refers to FIG. 2A and FIG. 2B. A switch circuit 206 is arranged to route paths between the computers 212 and the sets of manipulation and display devices 214. More particularly, the switch circuit 206 of the preferred embodiment has a switch chip 222 and a microprocessor 224. Electrical signals of the sets of manipulation and display devices 214, such as mouse signals or keyboard signals, are transmitted to the switch chip 222 through the client interface 104. The electrical signals are then transmitted to a predetermined one of the computers 212 according to paths stored in and routed by the switch chip 222. The paths are arranged and set by the microprocessor 224 based on a path selection setting, and users can modify the path selection setting through physical pressing or software control.

In order to support the digital visual interface and the analog visual interface simultaneously, the KVM switch 200 of the preferred embodiment can provide suitable image overlapping procedures for video signals of different types.

First, it is very easy to distinguish the types of video signals in practice. For example, the DVI-I connector supporting analog and digital displays corresponds to analog video signals and digital video signals, respectively, by different pins. Therefore, before a video signal enters the server interface 202, the video signal can be recognized as analog or digital according to its different corresponding pins. Furthermore, another effective and precise way is to distinguish by using different signal frequencies of the two types of video signals.

The following description first interprets the image overlapping procedure of the digital video signals. A digital video overlapping circuit 208 is arranged to receive a digital video signal DS from the computers 212 through the server interface 202. The digital video overlapping circuit 208 overlaps a digital video overlapping image, i.e. an on-screen display (OSD) image, onto the digital video signal DS according to an electrical signal from the sets of manipulation and display devices 214. The overlapped digital video signal COCDS is then transmitted to a predetermined one of the sets of manipulation and display devices 214 through the client interface 204.

More particularly, the digital video overlapping circuit 208 has a digital video receiving circuit 232, a digital video transmitting circuit 234 and a digital image generating circuit. After receiving the digital video signal DS, the digital video receiving circuit 232 is arranged to convert a signal mode of the digital video signal DS such that a digital video overlapping image is suitable for being overlapped onto the converted digital video signal CDS. In the preferred embodiment, the digital video signal DS of which the original signal mode is TMDS (Transition Minimized Differential Signal) is converted into 24-bit pixel data for a subsequent digital video overlapping stage.

The digital image generating circuit is arranged to generate the digital video overlapping image according to data stored in the switch circuit 206. For example, the content of the digital video overlapping image can display the system condition of the KVM switch 200 and the paths stored in the switch chip 222, for assisting users to manipulate and manage the KVM switch 200. Moreover, the digital video overlapping image contains a plurality of characters. The character can be words, letters of alphabets, numerals, symbols or icons, and each of the characters has a plurality of colors. Users can define these characters according to their needs, and store the setting of the digital video overlapping image in a memory 238.

In the preferred embodiment, the digital image generating circuit is a DVI controller 236. According to an electrical signal from the sets of manipulation and display devices 214 (such as keyboard commands entered by users), the microprocessor 224 instructs the DVI controller 236 to overlap the generated digital video overlapping image (i.e. the OSD image) onto the digital video signal CDS, thus completing the procedure of digital image overlapping. It is noted that, based on the digital image characteristics, the digital video overlapping image can be translucently overlapped onto the digital video signal CDS by the DVI controller 236. Therefore, the digital video overlapping image is translucently displayed on the set of manipulation and display devices 214, and the users can observe the image made of the original digital video signal and the additional digital video overlapping image, simultaneously.

Next, the digital video transmitting circuit 234 is arranged to convert a signal mode of the overlapped digital video signal OCDS such that the converted and overlapped digital video signal COCDS is suitable for transmission to the set of manipulation and display devices 214. As mentioned above, the digital video signal OCDS, of which the signal mode is 24-bit pixel data at this time, is converted into TMDS (Transition Minimized Differential Signal). Moreover, the digital video transmitting circuit 234 supports displays ranging from VGA to UXGA resolutions (25-165 MHz), and therefore is suitable for the sets of manipulation and display device 214 (such as LCDs).

The following description then interprets the image overlapping procedure of the analog video signals. An analog video overlapping circuit 210 is arranged to receive an analog video signal from the computers 212 through the server interface 202. The analog video overlapping circuit 210 overlaps an analog video overlapping image, i.e. an on-screen display (OSD) image, onto the analog video signal according to an electrical signal from the sets of manipulation and display devices 214. The overlapped analog video signal is then transmitted to a predetermined one of the sets of manipulation and display devices 214 through the client interface 204.

More particularly, the analog video overlapping circuit 210 has an analog video receiving circuit 242, an analog video transmitting circuit 244 and an analog video controller 246. The analog video controller 246 is arranged to generate the analog video overlapping image (i.e. the OSD image) according to data stored in the switch circuit 206. For example, the content of the analog video overlapping image can display the system condition of the KVM switch 200 and the paths stored in the switch chip 222, for assisting users to manipulate and manage the KVM switch 200. Moreover, according to an electrical signal from the sets of manipulation and display devices 214 (such as keyboard commands entered by users), the microprocessor 224 instructs the analog video controller 246 to overlap the analog video overlapping image onto the analog video signal, thus completing the procedure of analog image overlapping.

In addition, the set of manipulation and display devices 214 from which the user sends electrical signals can be the same as or different from the set of manipulation and display devices 214 that displays the overlapped video signal. When the two sets are the same, the video overlapping image is displayed only on the set of manipulation and display devices 214 used by the user at the same time. When the two sets are different, one user can make the video overlapping image be displayed on one set of manipulation and display devices 214 used by another user, and the video overlapping image is not limited to display to only one other user. This configuration allows a system administrator to manage and monitor other users with the digital video overlapping image, and thus enhances the management and monitoring performance of the KVM switch 200.

The preferred embodiment provides a KVM switch that can switch analog and digital video signals. The KVM switch provides corresponding OSD images for video signals of different types, and thus improves the manipulating function and enhances the compatibility and expandability thereof. Moreover, computers and manipulation and display device having different video interfaces can be connected through the KVM switch, and the OSD image of the KVM switch can be used to switch and manage the system. The preferred embodiment provides a convenient and cheap KVM switch for multiple servers/clients.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A keyboard-video-mouse (KVM) switch for connecting a plurality of computers and plural sets of user input and display devices, the KVM switch comprising:

a server interface connected to the plurality of computers, wherein the server interface supports a first visual interface and a second visual interface and is configured to receive a video signal from the plurality of computers in a first format through the first visual interface or in a second format through the second visual interface;

a client interface connected to the plural sets of user input and display devices, wherein the client interface supports a third visual interface and a fourth visual interface and is configured to supply a video signal in the first format through the third visual interface or in the second format through the fourth visual interface;

a switch circuit, coupled between the server interface and the client interface, configured to route paths among the computers and the sets of user input and display devices;

a first overlapping circuit configured to receive the video signal in the first format from the server interface and to overlap a first video overlapping image onto the video signal in the first format, thereby generating a first overlapped video signal in the first format;

a first transmitting circuit configured to transmit the first overlapped video signal in the first format to one of the sets of user input and display devices through the third visual interface of the client interface;

a first conversion circuit configured to receive the video signal in the second format from the server interface and to convert the video signal in the second format to a first converted video signal in an intermediate format;

a second overlapping circuit configured to receive the first converted video signal in the intermediate format from the first conversion circuit and to overlap a second video overlapping image onto the first converted video signal, thereby generating a second overlapped video signal in the intermediate format;

a second conversion circuit configured to receive the second overlapped video signal in the intermediate format from the second overlapping circuit and to convert the second overlapped video signal to a second converted video signal in the second format; and a second transmitting circuit configured to transmit the second converted video signal in the second format to one of the sets of user input and display devices through the fourth visual interface of the client interface;

wherein the set of user input and display devices that sends an electrical signal to activate the overlapping circuits is different from the set of user input and display devices that displays the overlapped video signal.

2. The keyboard-video-mouse switch of claim 1, wherein the switch circuit routes the paths in response to a path selection setting.

3. The keyboard-video-mouse switch of claim 1, wherein the first conversion circuit converts the video signal in the second format to the first converted video signal in the intermediate format such that the second video overlapping image in the second format is suitable for being overlapped onto the first converted video signal.

4. The keyboard-video-mouse switch of claim 1, wherein the first overlapping circuit further comprises a first image generating circuit configured to generate the first video overlapping image in the first format in response to the switch circuit and to overlap the first video overlapping image onto at least a portion of the video signal in the first format.

5. The keyboard-video-mouse switch of claim 1, wherein the second overlapping circuit further comprises a second image generating circuit configured to generate the second video overlapping image in response to the switch circuit, and to overlap the second video overlapping image onto at least a portion of the first converted digital video signal.

6. The keyboard-video-mouse switch of claim 1, wherein a signal mode of the video signal in the second format is converted from TMDS (Transition Minimized Differential Signal) into 24-bit pixel data by the first conversion circuit.

7. The keyboard-video-mouse switch of claim 1, wherein a signal mode of the second overlapped video signal is converted from 24-bit pixel data into TMDS (Transition Minimized Differential Signal) by the second conversion circuit.

8. The keyboard-video-mouse switch of claim 1, wherein one of the first and the second video overlapping images comprises a plurality of characters, and each of the characters has a plurality of colors.

9. The keyboard-video-mouse switch of claim 8, wherein the characters comprise words, letters of alphabets, numerals, symbols or icons.

10. The keyboard-video-mouse switch of claim 1, wherein one of the first and the second video overlapping images is translucently displayed on the sets of user input and display devices.

11. The keyboard-video-mouse switch of claim 1, further comprising: a memory arranged to store a setting of the first and second video overlapping images.

12. A computer switch for connecting a plurality of computers and plural sets of user input and display devices, the computer switch comprising:

a server interface connected to the plurality of computers, wherein the server interface supports a first visual interface and a second visual interface and is configured to receive a video signal from the plurality of computers in a first format through the first visual interface or in a second format through the second visual interface;

a client interface connected to the plural sets of user input and display devices, wherein the client interface supports a third visual interface and a fourth visual interface and is configured to supply a video signal in the first format through the third visual interface or in the second format through the fourth visual interface;

a switch circuit, coupled between the server interface and the client interface, configured to route paths among the computers and the sets of user input and display devices;

a first overlapping circuit configured to receive the video signal in the first format from the server interface and to overlap a first video overlapping image onto the video signal in the first format, thereby generating a first overlapped video signal in the first format;

a first transmitting circuit configured to transmit the first overlapped video signal in the first format to one of the sets of user input and display devices through the third visual interface of the client interface;

a first conversion circuit configured to receive the video signal in the second format from the server interface and to convert the video signal in the second format to a first converted video signal in an intermediate format;

a second overlapping circuit configured to receive the first converted video signal in the intermediate format from the first conversion circuit and to overlap a second video overlapping image onto the first converted video signal, thereby generating a second overlapped video signal in the intermediate format;

a second conversion circuit configured to receive the second overlapped video signal in the intermediate format from the second overlapping circuit and to convert the second overlapped video signal to a second converted video signal in the second format; and a second transmitting circuit configured to transmit the second converted video signal in the second format to one of the sets of user input and display devices through the fourth visual interface of the client interface;

wherein the set of user input and display devices that sends an electrical signal to activate the overlapping circuits is different from the set of user input and display devices that displays the overlapped video signal.

13. A computer switch for connecting a plurality of computers and plural sets of user input and display devices, the computer switch comprising:

a server interface connected to the plurality of computers, wherein the server interface supports a first visual interface and a second visual interface and is configured to receive a video signal from the plurality of computers in a first format through the first visual interface or in a second format through the second visual interface;

a client interface connected to the plural sets of user input and display devices, wherein the client interface supports a third visual interface and a fourth visual interface and is configured to supply a video signal in the first format through the third visual interface or in the second format through the fourth visual interface;

a switch circuit, coupled between the server interface and the client interface, configured to route paths among the computers and the sets of user input and display devices;

a first conversion circuit configured to receive the video signal in the first format from the server interface and to convert the video signal in the first format to a first converted video signal in an intermediate format;

a first overlapping circuit configured to receive the first converted signal in the intermediate format from the first conversion circuit and to overlap a first video overlapping image onto the first converted video signal, thereby generating a first overlapped video signal in the intermediate format;

a second conversion circuit configured to receive the first overlapped video signal in the intermediate format from the first overlapping circuit and to convert the first overlapped video signal to a second converted video signal in the first format; and a first transmitting circuit configured to transmit the second converted video signal in the first format to one of the sets of user input and display devices through the third visual interface of the client interface;

wherein the set of user input and display devices that sends an electrical signal to activate the overlapping circuits is different from the set of user input and display devices that displays the overlapped video signal.

14. The computer switch of claim 13 further comprising:

a second overlapping circuit configured to receive the video signal in the second format from the server interface and to overlap a second video overlapping image onto the video signals in the second format, whereby generating a second overlapped video signal in the second format; and a second transmitting circuit configured to transmit the second overlapped video signal in the second format to one of the sets of user input and display devices through the fourth visual interface of the client interface.

* * * * *